United States Patent
Fang

(10) Patent No.: US 9,966,789 B2
(45) Date of Patent: May 8, 2018

(54) WIRELESS CHARGING SYSTEM WITH PROTECTION MECHANISM

(71) Applicant: NEWVASTEK CO., LTD., New Taipei (TW)

(72) Inventor: Ming Liang Fang, New Taipei (TW)

(73) Assignee: NEWVASTEK CO., LTD., New Taipei (TW)

( * ) Notice: Subject to any disclaimer, the term of this patent is extended or adjusted under 35 U.S.C. 154(b) by 79 days.

(21) Appl. No.: 15/287,721

(22) Filed: Oct. 6, 2016

(65) Prior Publication Data

US 2018/0102665 A1    Apr. 12, 2018

(51) Int. Cl.
| | |
|---|---|
| *H02J 7/00* | (2006.01) |
| *H01F 27/28* | (2006.01) |
| *H02J 7/02* | (2016.01) |
| *H02J 50/12* | (2016.01) |

(52) U.S. Cl.
CPC .............. *H02J 7/025* (2013.01); *H02J 7/007* (2013.01); *H02J 50/12* (2016.02); *H02J 2007/0096* (2013.01)

(58) Field of Classification Search
CPC ..... H02J 7/025; H02J 50/12; H02J 2007/0096
USPC ......................................... 320/108; 307/104
See application file for complete search history.

(56) References Cited

U.S. PATENT DOCUMENTS

| | | | | |
|---|---|---|---|---|
| 8,310,200 | B2* | 11/2012 | Matouka | H02J 7/025 320/108 |
| 8,415,834 | B2* | 4/2013 | Suzuki | H02J 7/025 307/104 |
| 8,723,642 | B2* | 5/2014 | Park | G07F 15/006 340/5.8 |
| 8,890,471 | B2* | 11/2014 | Chen | H02J 7/0042 320/108 |
| 2003/0085684 | A1* | 5/2003 | Tsukamoto | A61N 1/3787 320/108 |
| 2011/0018499 | A1* | 1/2011 | Fujiwara | H01M 10/46 320/108 |
| 2011/0080051 | A1* | 4/2011 | Lee | H02J 5/005 307/104 |
| 2012/0256586 | A1* | 10/2012 | Becker | B60L 11/182 320/108 |
| 2012/0306284 | A1* | 12/2012 | Lee | H02J 17/00 307/104 |

(Continued)

*Primary Examiner* — M'Baye Diao
(74) *Attorney, Agent, or Firm* — Leong C. Lei

(57) ABSTRACT

The wireless charging system includes a base member for placing a to-be-charged device, a wireless power transmission module for wireless charging the to-be-charged device through a magnetic resonance unit, an impedance detection module, a power throttle module, an information reception module. Through the wireless charging system, firstly, the to-be-charged device is wireless charged on the base member. Secondly, when the to-be-charged device is not a desired object and reveals a higher impedance value, the impedance detection module would detects this and inhibits/throttles the wireless power transmission module. Thirdly, if the to-be-charged object is a desired one but attached with some metallic object such as a metallic back cover, the wireless charging system may continue wireless charging according to the impedance information from the wireless reception module.

10 Claims, 7 Drawing Sheets

(56) References Cited

U.S. PATENT DOCUMENTS

| | | | |
|---|---|---|---|
| 2013/0175986 A1* | 7/2013 | Senatori | G06F 1/1616 320/108 |
| 2014/0368163 A1* | 12/2014 | Ho | H02J 7/025 320/108 |
| 2015/0097519 A1* | 4/2015 | Chen | H02J 7/025 320/108 |
| 2015/0137732 A1* | 5/2015 | Lai | H02J 7/025 320/101 |
| 2015/0162767 A1* | 6/2015 | Oh | H02J 7/0044 320/108 |
| 2015/0236537 A1* | 8/2015 | Luo | H02J 7/0029 320/108 |
| 2015/0372498 A1* | 12/2015 | Ichikawa | B60L 11/1803 307/104 |
| 2016/0006264 A1* | 1/2016 | Alperin | H02J 5/005 307/104 |
| 2016/0181859 A1* | 6/2016 | Makwinski | H02J 50/40 320/108 |

\* cited by examiner

WIRELESS CHARGING SYSTEM WITH PROTECTION MECHANISM

BACKGROUND OF THE INVENTION

(a) Technical Field of the Invention

The present invention is generally related to wireless charging, and more particular to a wireless charging system capable of resolving the overheating problem when metallic objects are present within the chargeable area.

(b) Description of the Prior Art

Wireless charging transfers power by induction means between a charger and an appliance to be charged without physically connecting them using cables, therefore achieving advantages such as convenience, safe, and robustness.

To achieve wireless power transfer, a power provision module of the charger and a power reception module of the appliance have to be placed in proximity (i.e., chargeable area) so as to achieve induction and magnetic coupling between the modules' coils. During wireless charging, if a metallic object is within the chargeable area, the metallic object would be influenced by the magnetic field and eddy current may be produced, causing the metallic object or the power provision module to heat up. For example, some cellular phones are equipped with metallic back covers and overheating problem would occur when these cellular phones are wireless charged.

To overcome this problem, there are teachings using magnetic resonance to conduct wireless charging. Most of the time, the overheating problem is avoided even when there are metallic objects present in the chargeable area. However, thin metallic objects such as compact discs (CDs) or digital video discs (DVDs) may still suffer the overheating problem.

SUMMARY OF THE INVENTION

A major objective of the present invention is to employ magnetic resonance for wireless charging so that most thin metallic objects are not overheated. For some special thin metallic objects that may be of problem, a protection mechanism is provided for safe wireless charging.

To achieve the objective, the wireless charging system includes a base member and at least a to-be-charged device selectively placed on the main member. Inside the main member, there is a wireless power transmission module including a magnetic resonance unit for selectively wireless charging the to-be-charged device through magnetic resonance unit. The to-be-charged device includes a wireless power reception module interacting with the wireless power transmission module. The to-be-charged device also includes an information transmission module for transmitting impedance information about the to-be-charged device. Inside the base member, there is an impedance detection module for obtaining a detected impedance value within a chargeable area. There is also a power throttle module electrically connected to the impedance detection module inhibiting or reducing the output power of the wireless power transmission module when the detected impedance value exceeds a preset impedance value. An information reception module is electrically connected to the impedance detection module and the power throttle module for receiving impedance information and inhibiting the power throttle module. When a user utilizes the present invention to wireless charge a to-be-charged device (such as a cellular phone), due to the use of the magnetic resonance unit, most of the time normal charging is maintained without causing overheating even though some metallic object is present within the chargeable area through the interaction between the wireless power transmission and reception modules. If the impedance detection module detects an impedance value too high due to some particular metallic object, the information reception module determines first whether impedance information has been received from the information transmission module. If not, it is determined that there is some unsafe factor and the power throttle module is engaged to stop or reduce the output power of wireless charging. If yes, meaning even though some particular metallic object is present the impedance is still within an acceptable range, the wireless charging is allowed to continue.

Through the above technique, a resolution is provided to the overheating problem when there is some metallic object present within the chargeable area by conventional wireless charging, and to the failure of magnetic resonance to charge some particular thin metallic objects.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
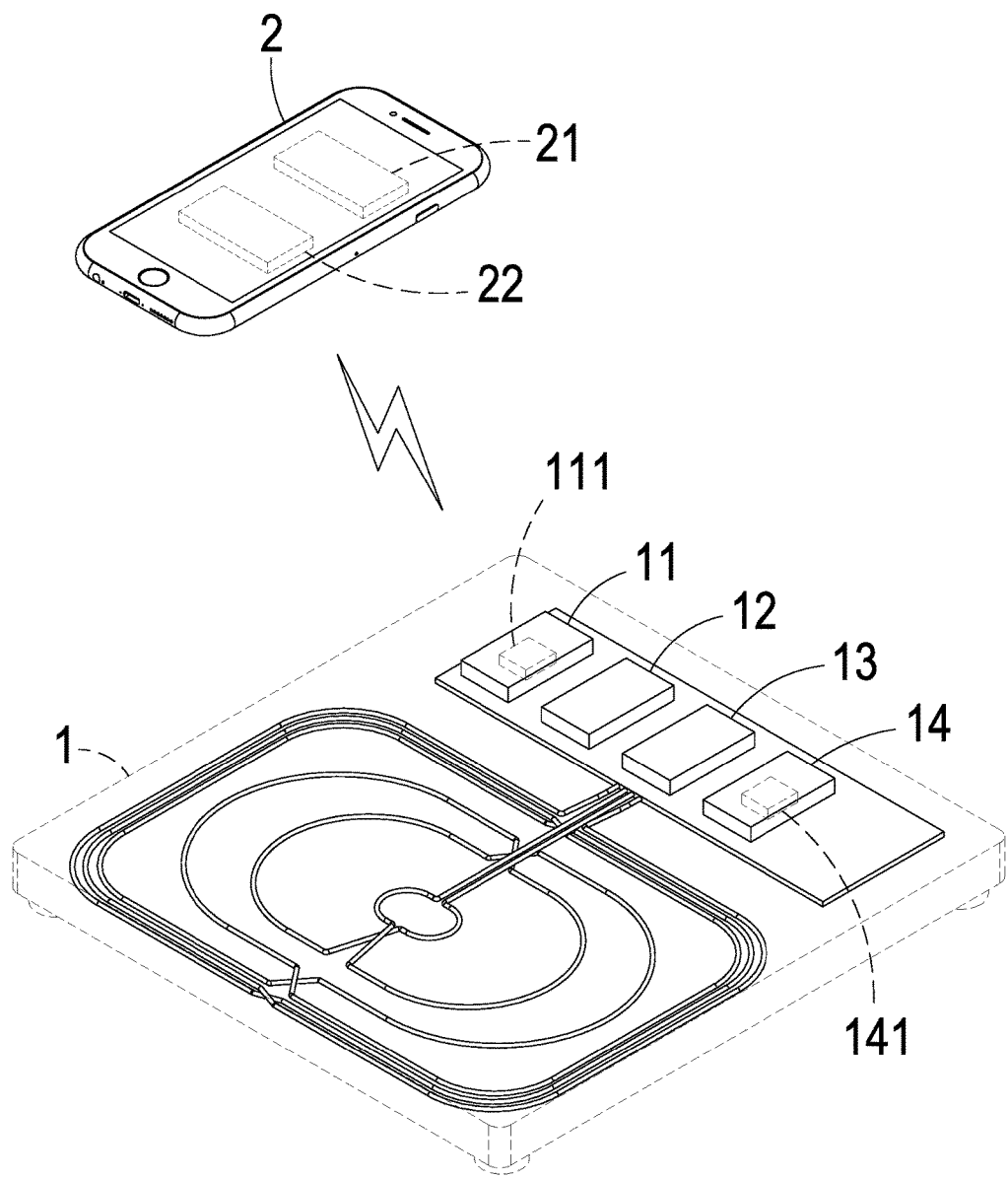
FIG. 1 is a perspective diagram showing a wireless charging system according to an embodiment of the present invention.
Figure 2:
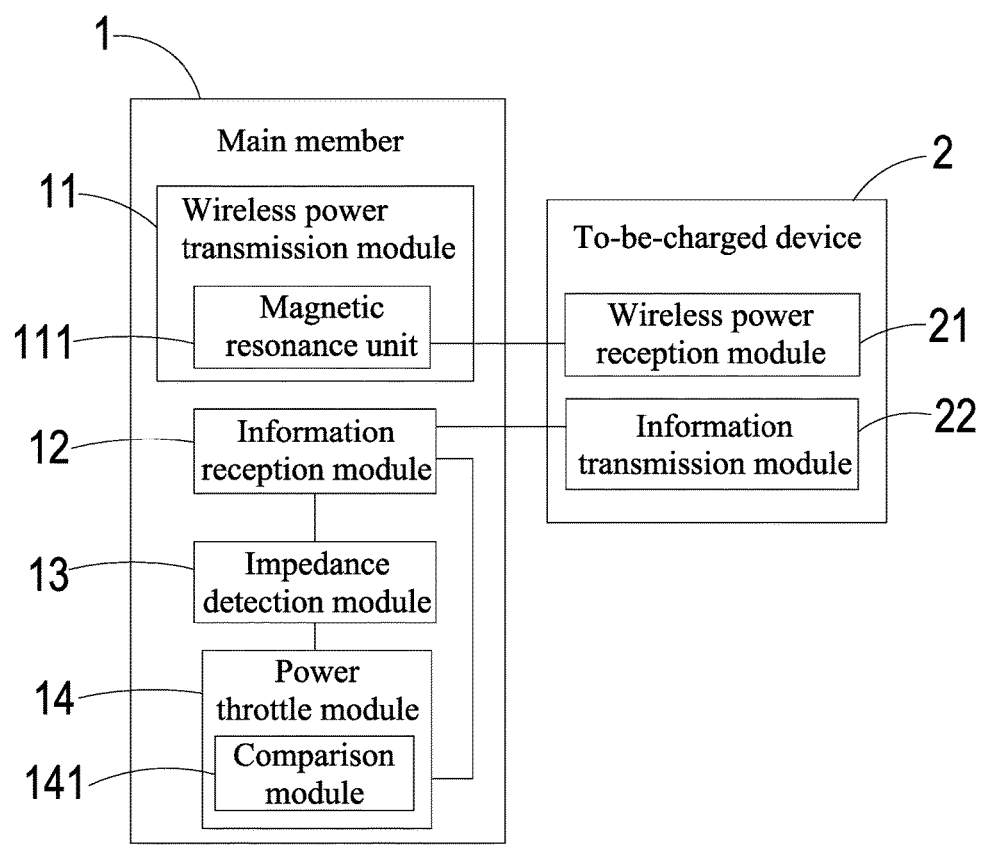
FIG. 2 is a functional block diagram showing the wireless charging system of FIG. 1.
Figure 3:
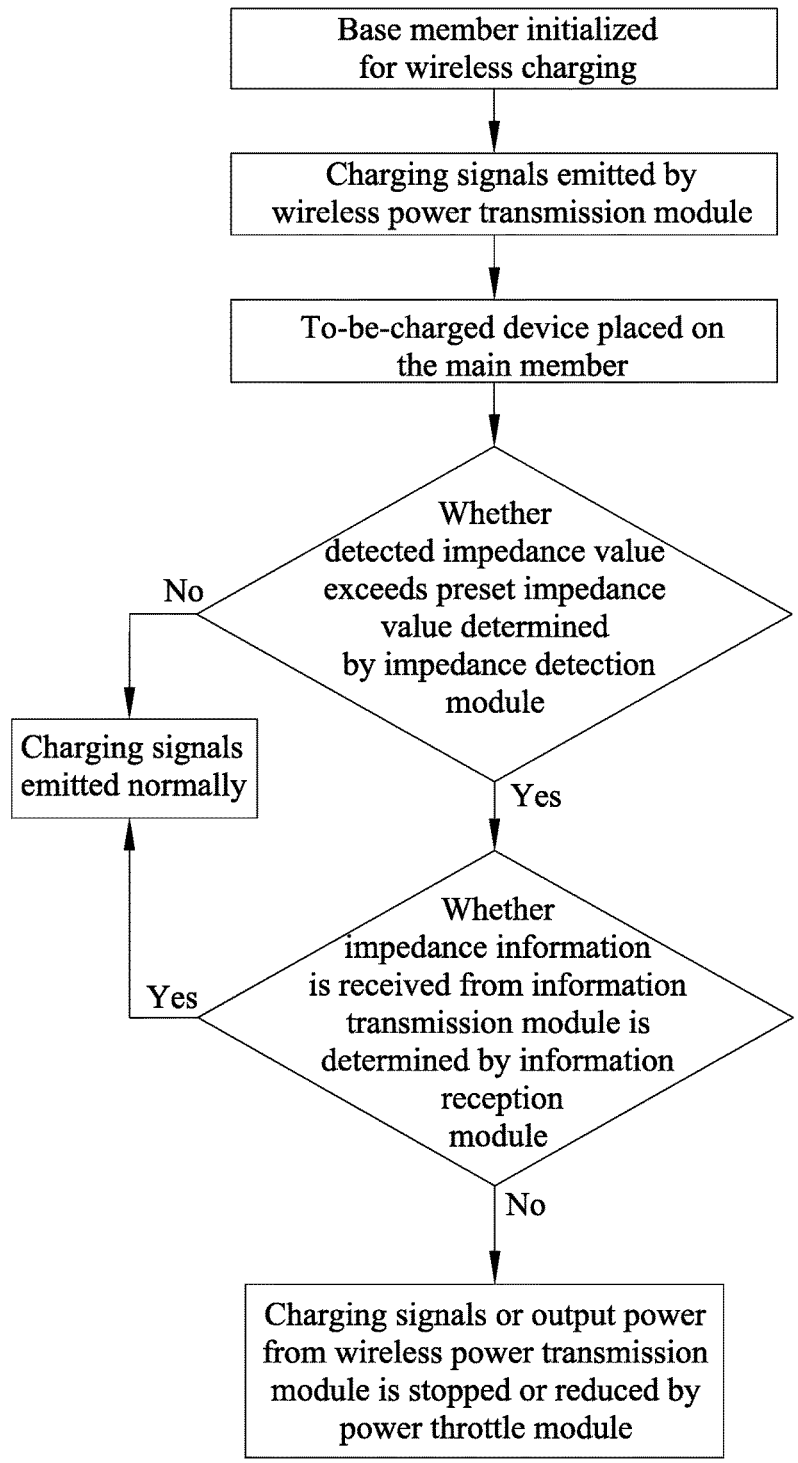
FIG. 3 is a flow diagram showing an operation flow of the wireless charging system of FIG. 1.
Figure 4:
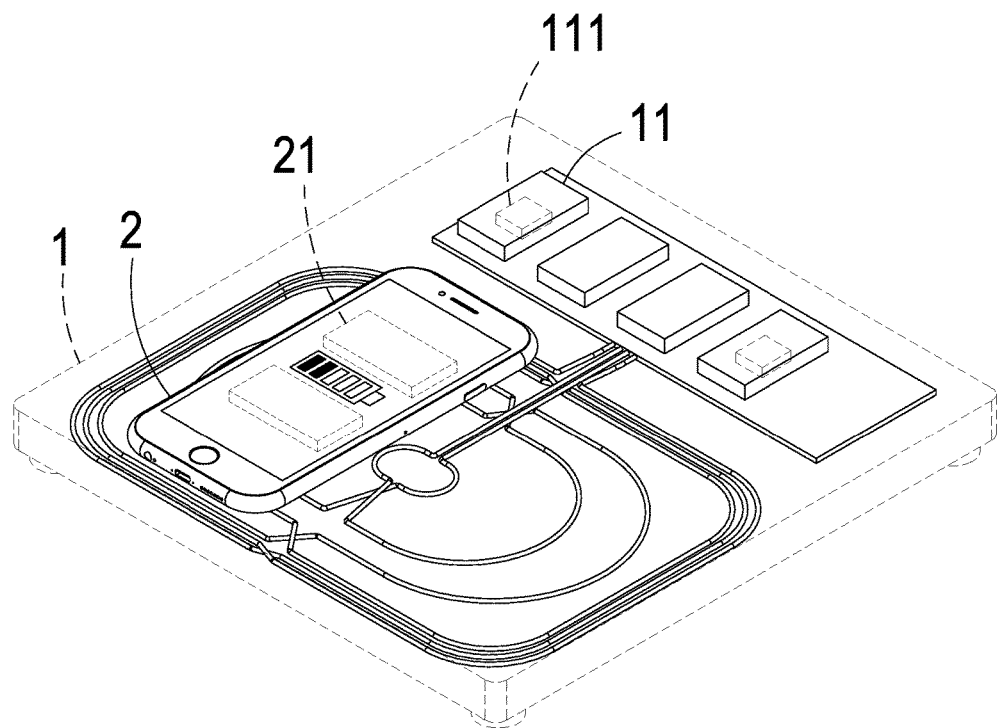
FIG. 4 is a perspective diagram showing a cellular phone placed on a main member of the wireless charging system of FIG. 1.
Figure 5:
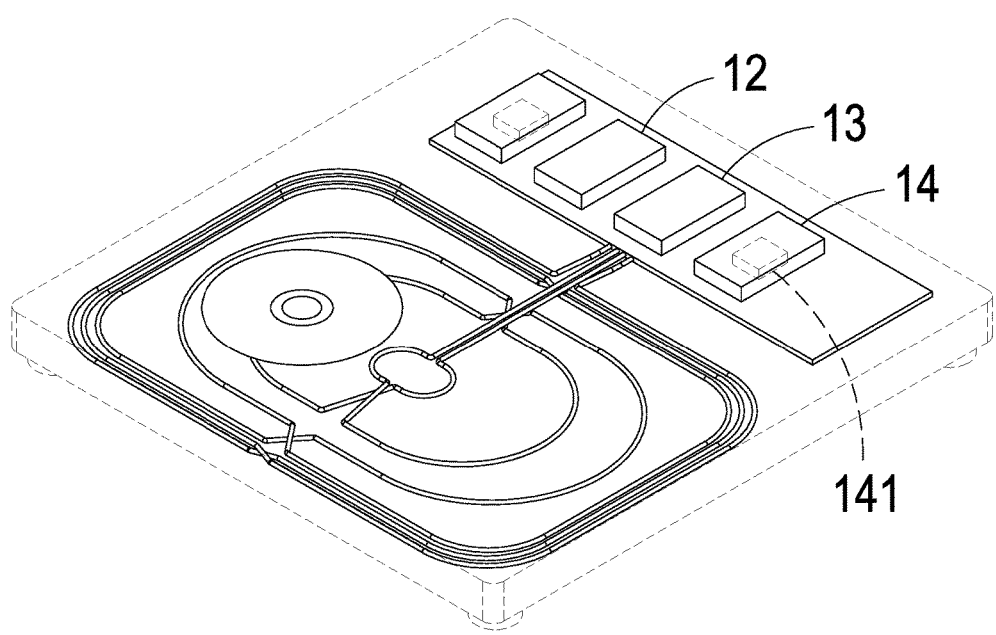
FIG. 5 is a perspective diagram showing a CD or DVD placed on a main member of the wireless charging system of FIG. 1.
Figure 6:
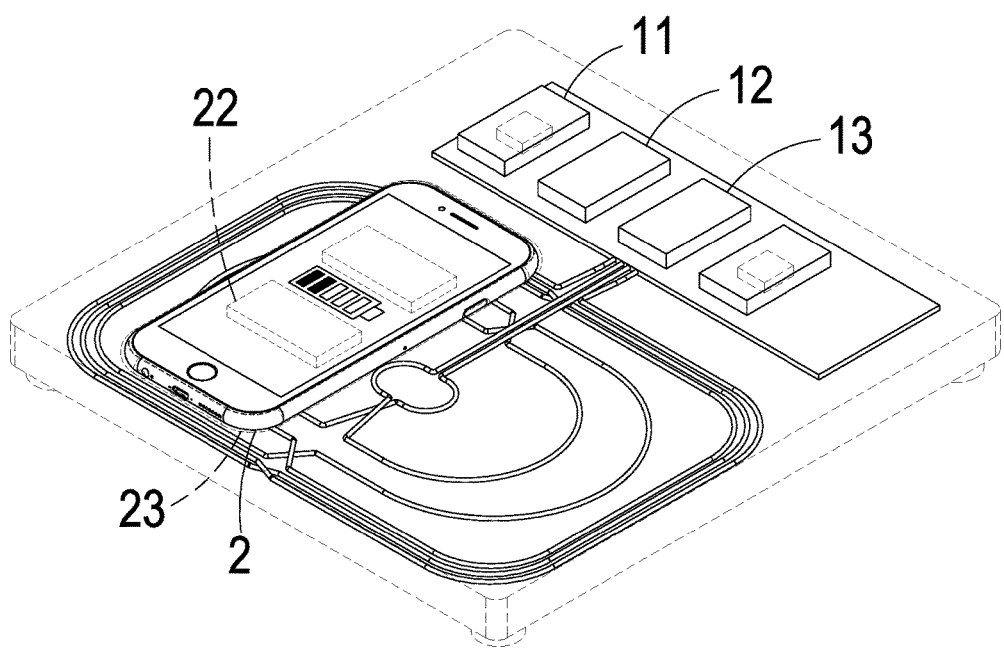
FIG. 6 is a perspective diagram showing a cellular phone with a metallic back cover placed on a main member of the wireless charging system of FIG. 1.

As shown in FIG. 1, a wireless charging system according to an embodiment of the present invention includes the following components.

There is a base member 1.

A to-be-charged device 2 is placed on the base member 1 for wireless charging. In the present embodiment, the to-be-charged device 2 may be a mobile electronic device such as a smart phone, a tablet computer, etc.

A wireless power transmission module 11 is configured inside the base member 1. The wireless power transmission module 11 includes a magnetic resonance unit 111 for selectively charging the to-be-charged device 2 through magnetic resonance.

A wireless power reception module 22 is configured inside the to-be-charged device 2 interacting with the wireless power transmission module 11.

An information transmission module 22 is configured inside the to-be-charged device 2 for transmitting impedance information of the to-be-charged device 2.

An impedance detection module 13 is configured inside the base member 1 for detecting the impedance value of the to-be-charged device 2.

A power throttle module 14 is electrically connected to the impedance detection module 13. The power throttle module 14 inhibits the operation of or reduces the output power of the wireless power transmission module 11 when the impedance value exceeds a preset impedance value. The power throttle module 14 includes a comparison module 141 for determining whether the impedance value is greater than the preset impedance value or not.

An information reception module 12 is electrically connected to the impedance detection module 13 and the power throttle module 14 for receiving the impedance information and engaging the power throttle module 14.

The information transmission and reception modules 22 and 12 communicate with each other through Bluetooth.

As shown in FIGS. 1 to 6, the appearance of the present embodiment is similar to ordinary wireless charging systems. To conduct wireless charging, the to-be-charged device 2 is also placed on the base member 1. Then, the wireless power transmission module 11 continuously emits charging signals to charge the to-be-charged device 2. The wireless power transmission module 11 employs the magnetic resonance unit 111 to charge the to-be-charged device 2 through magnetic resonance. As long as the wireless power reception module 21 of the to-be-charged device 2 is able to receive the charging signals, the to-be-charged device 2 enters a wireless charging process.

If a metallic objet appears on the base member 1 or within the chargeable area other than the to-be-charged device 2, the impedance detection module 13 detects a higher impedance value. The comparison module 141 compares the detected impedance value against the preset impedance value representing a safe range. If the detected impedance value is greater than the preset impedance value (e.g., the metallic object is a thin metallic object such as CD, DVD, etc.), the information reception module 12 then further determines whether impedance information has been received from the information transmission module 22. If no impedance information is received, it is determined that the detected higher impedance value should be from a metallic object other than the to-be-charged device 2. The power throttle module 14 inhibits the wireless power transmission module 11's charging operation or reduces the output power. On the other hand, if impedance information is indeed received, it is determined that the detected higher impedance value is from a metallic object attached to the to-be-charged device 2 such as its metallic back cover 23. It is then the power throttle module 14 is inhibited so that the wireless power transmission module 11 wireless-charges the to-be-charged device 2. For example, if the preset impedance value is 100, a cellular phone alone has impedance 30, and the metallic back cover 23 has impedance 80, then the impedance detection module 13 would detect an impedance value 110 greater than the preset impedance value 100. The cellular phone would transmit an impedance information, indicating that the detected higher impedance value is normal and wireless charging can be safely conducted.

Figure 7:
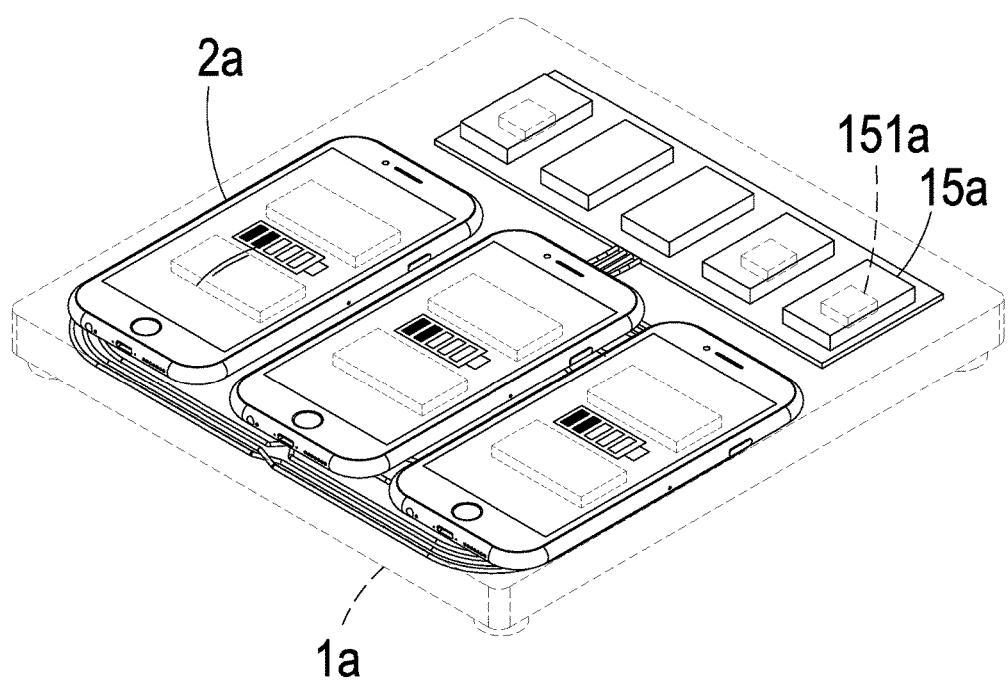
FIG. 7 is a perspective diagram showing multiple cellular phones placed on a main member of a wireless charging system according to another embodiment of the present invention.

As shown in FIG. 7, the base member 1a includes a current control unit 15a so that, when there are multiple to-be-charged devices 2a on the main member 1a, an output current is adjusted and each to-be-charged device 2a receives a same amount of current. The current control unit 15a includes a processing module 151a for calculating the variation of the detected impedance value and adjusting the current control unit 15a's output current. Therefore, for additional to-be-charged devices 2a added within the chargeable area of the base member 1a, the processing module 151a is able to calculate impedance variation and instructs the current control unit 15a to adjust its output current so that the to-be-charged devices 2 all receive a same amount of current. In other words, when the base member 1a charges multiple to-be-charged device 2a simultaneously, the charging efficiency is not compromised by increasing the output current.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A wireless charging device, comprising
    a base member for the placement of at least one to-be-charged device;
    a wireless power transmission module inside the base member comprising a magnetic resonance unit for selectively wireless charging the at least one to-be-charged device through magnetic resonance;
    an impedance detection module inside the base member for obtaining a detected impedance value from a chargeable area of the wireless power transmission module;
    a power throttle module inside the base member electrically connected to the impedance detection module for inhibiting or reducing an output power of the wireless power transmission module when the detected impedance value exceeds a preset impedance value; and
    an information reception module inside the base member electrically connected to the impedance detection module and the power throttle module for receiving impedance information from the at least one to-be-charged device and selectively inhibiting the power throttle module.

2. The wireless charging device according to claim 1, further comprising a current control unit providing a variable output current in accordance with the number of the at least one to-be-charged device so that each of the at least one to-be-charged device receives a same amount of power.

3. The wireless charging device according to claim 2, wherein the current control unit comprises a processing module for calculating a variation of the detected impedance value and adjusting the output current of the current control unit accordingly.

4. The wireless charging device according to claim 1, wherein the power throttle module comprises a comparison module for determining whether the detected impedance value exceeds the preset impedance value.

5. The wireless charging device according to claim 1, wherein the information reception module receives impedance information through Bluetooth means.

6. A wireless charging system, comprising
a base member;
at least one to-be-charged device selectively placed on the base member;
a wireless power transmission module inside the base member comprising a magnetic resonance unit for selectively wireless charging the at least one to-be-charged device through magnetic resonance;
a wireless power reception module inside each of the at least one to-be-charged device interacting with the wireless power transmission module;
an information transmission module inside each of the at least one to-be-charged device transmitting impedance information regarding the to-be-charged device;
an impedance detection module inside the base member for obtaining a detected impedance value from a chargeable area of the wireless power transmission module;
a power throttle module inside the base member electrically connected to the impedance detection module for inhibiting or reducing an output power of the wireless power transmission module when the detected impedance value exceeds a preset impedance value; and
an information reception module inside the base member electrically connected to the impedance detection module and the power throttle module for receiving impedance information from the at least one to-be-charged device and selectively inhibiting the power throttle module.

7. The wireless charging system according to claim 6, further comprising a current control unit providing a variable output current in accordance with the number of the at least one to-be-charged device so that each of the at least one to-be-charged device receives a same amount of power.

8. The wireless charging system according to claim 7, wherein the current control unit comprises a processing module for calculating a variation of the detected impedance value and adjusting the output current of the current control unit accordingly.

9. The wireless charging system according to claim 6, wherein the power throttle module comprises a comparison module for determining whether the detected impedance value exceeds the preset impedance value.

10. The wireless charging system according to claim 6, wherein the information transmission and reception modules communicate with each other through Bluetooth means.

* * * * *